United States Patent [19]
Darwin et al.

[11] Patent Number: 5,753,744
[45] Date of Patent: May 19, 1998

[54] CEMENT AND CEMENT COMPOSITION HAVING IMPROVED RHEOLOGICAL PROPERTIES

[75] Inventors: David Charles Darwin, Columbia; Ellis Martin Gartner, Silver Spring, both of Md.; Ahmad Arfaei, Chelmsford; Xiaojia Zhang, Acton, both of Mass.

[73] Assignee: W.R. Grace & Co.-Conn., New York, N.Y.

[21] Appl. No.: 663,560

[22] Filed: Jun. 13, 1996

Related U.S. Application Data

[63] Continuation-in-part of Ser. No. 395,405, Feb. 27, 1995, abandoned.

[51] Int. Cl.$^6$ .............................. C04B 24/12; C08F 30/04
[52] U.S. Cl. ......................... 524/549; 524/5; 524/548; 524/553; 524/577; 106/810; 526/262; 526/333
[58] Field of Search ........................ 524/5, 548, 553, 524/577, 549; 106/810; 526/262, 333

[56] References Cited

U.S. PATENT DOCUMENTS

| | | | |
|---|---|---|---|
| 4,653,584 | 3/1987 | Ball et al. | 526/262 |
| 4,662,942 | 5/1987 | Koga et al. | 524/5 |
| 5,100,984 | 3/1992 | Burge et al. | 526/240 |
| 5,369,198 | 11/1994 | Albrecht et al. | 526/262 |

FOREIGN PATENT DOCUMENTS

| | | | |
|---|---|---|---|
| 0306449 | 3/1989 | European Pat. Off. | 524/5 |
| 52-23129 | 2/1977 | Japan | 524/5 |
| 60-191043 | 9/1985 | Japan | 524/5 |
| 1070126 | 1/1984 | U.S.S.R. | 524/5 |

*Primary Examiner*—Andrew E.C. Merriam
*Attorney, Agent, or Firm*—William L. Baker; Craig K. Leon

[57] ABSTRACT

An improved hydraulic cement and resultant hydraulic cement composition which has an alkyl terminated alkoxy amine derivative of maleic acid based polymer or copolymer uniformly distributed therein.

31 Claims, No Drawings

CEMENT AND CEMENT COMPOSITION HAVING IMPROVED RHEOLOGICAL PROPERTIES

This application is a continuation-in-part of our application U.S. Ser. No. 08/395,405, filed Feb. 27, 1995, now abandoned for "Improved Cement and Cement Composition Having Improved Rheological Properties".

BACKGROUND OF THE INVENTION

The present invention is directed to an improved hydraulic cement and to cement compositions having the subject improved cement therein. Specifically, the present invention relates to an improved hydraulic cement composition composed of a mixture of a hydraulic cement and an amino alkoxy derivative of maleic acid polymers, as fully described below, and the hydraulic cement compositions, such as mortar and concrete, capable of exhibiting high flowability and retention of flowability over a sustained period of time without imparting a significant delay in the initial set time of the composition.

Although increased flowability can be attained by using large dosages of water in a hydrating cement composition, it is well known that the resultant cement based structure will have poor compressive strength and related properties. Various additives have been proposed to increase the flowability (known as "slump") to cement composition, such as mortar and concrete compositions, without increasing the water content of the initially formed composition. Such additives have been classified as "cement superplasticizers" and include, for example, compounds, such as naphthalene sulfonate-formaldehyde condensates lignin sulfonates and the like.

More recently, copolymers of alkenyl ethers and acrylic acid or maleic anhydride, and derivatives thereof, have been proposed as agents suitable to enhance slump [Japanese Patent Publication (Kokai) Nos 285140/88 and 163108/90]. Further, copolymers of hydroxy-terminated allylether and maleic anhydride and their salt, or ester derivatives, such as disclosed in U.S. Pat. No. 4,471,100, or copolymers of maleic anhydride and styrene which have been partially esterified, as disclosed in U.S. Pat. No. 5,158,996, have been proposed as cement admixtures capable of enhancing slump.

In each of the above instances, the proposed cement admixture does not provide the desired combination of properties or only provides them in low degrees. For example, esterified acrylate copolymers, while providing good slump enhancement, causes the treated cement composition to exhibit excessive set retardation.

It is highly desired to have an admixture for cement compositions which is capable of imparting to the treated composition, a high degree of slump, of preventing a decrease in slump (decrease in flowability) over a sustained period of time, and at the same time, not causing the composition to exhibit excessive set retardation.

SUMMARY OF THE INVENTION

The present invention is directed to an improved hydraulic cement and to cement composition formed with said cement, wherein the cement contains an amino alkoxy derivative of maleic acid polymer or copolymers thereof. The polymer can be represented by the general formula

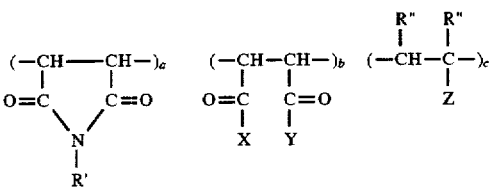

wherein R' represents a $C_2-C_{10}$ (preferably a $C_2-C_4$) oxyalkylene group, (AO), or a plurality (1–200, preferably from 1 to about 70) of said groups which is terminated with a $C_1-C_{10}$ alkyl group, $C_5-C_6$ cycloalkyl group or aryl group or mixture thereof; X and Y each independently represent NHR', OH, $O^-M^+$ where M is an alkali metal, or ammonium cation, or X and Y together represent $—O^-M^{++}O^-—$ when $M^{++}$ is an alkaline earth metal cation; R" represents hydrogen atom or methyl group; Z represents unsubstituted or substituted aryl, $C_5-C_6$ cycloalkyl, a $C_5-C_6$ heterocyclic group, the group OR'", where R'" represents a $C_1-C_5$ alkyl or $C_5-C_6$ cycloalkyl group or the group C(O)X, where X is as defined above; and a, b and c each represent molar percentages of the polymer's structure such that in a particular polymer a has a value of 0 to 100 (preferably at least about 2), b has a value of from 0 to 100, the sum of a plus b is from about 20 to 100, and c has a value of from 0 to 80 and wherein the (AO) groups comprise at least about 5 weight percent of the polymer.

Cement compositions formed with the cement admixture of the present invention have been unexpectedly found to exhibit a high degree of slump over a sustained period of time while not having any significant set retardation.

DETAILED DESCRIPTION OF THE INVENTION

The present invention is directed to an improved cement admixture and to cements and cement compositions formed with said cement admixture. The presently described improved cement has been unexpectedly found to provide a cement composition, such as mortar or concrete, having high flowability over an extended period of time without imparting a significant delay in the initial set time of the composition. Thus the presently achieved cement compositions are capable of being readily formed into a desired shape, having substantial self-leveling properties and can be worked over an extended period from commencement of hydration. At the same time, the present cement composition does not exhibit extensive delay in set and, therefore, does not delay the timetable for forming the desired structure.

The improved cement of the present invention is composed of a substantially uniform mixture of an amino alkoxy derivative of maleic acid polymer, as fully described below, and a hydraulic cement. The cement can be selected from any conventional hydraulic cement such as, for example, ordinary portland cement (meeting the requirements of ASTM C-150), high early strength portland cement, ultra high early strength portland cement, blast-furnace slag cement, fly-ash cement, blended portland cements, calcium aluminate cements, calcium sulfate cements, magnesium phosphate cements and the like.

The amino alkoxy derivative of maleic acid polymers and copolymers thereof have been unexpectedly found to provide an improved cement product and resultant cement composition. The subject polymer of the present invention can be represented by the formula

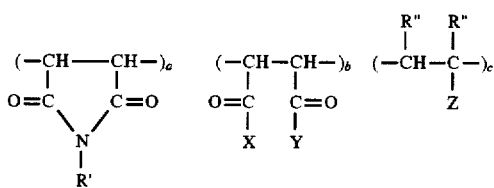

wherein R' represents a $C_2$–$C_{10}$ (preferably a $C_2$–$C_4$) oxyalkylene group, (AO), or a plurality (1–200, preferably from 1 to about 70) of said groups which is terminated with a $C_1$–$C_{10}$ alkyl group, $C_5$–$C_6$ cycloalkyl or an aryl group or mixture thereof; X and Y each independently represent NHR', OH, $O^-M^+$ where M is an alkali metal or ammonium cation, or X and Y together represent —$O^-M^{++}O^-$— when $M^{++}$ is an alkalene earth metal cation; R" represents hydrogen atom or methyl group; Z represents unsubstituted or substituted aryl or $C_5$–$C_6$ cycloalkyl or a $C_5$–$C_6$ heterocyclic group or the group OR'", where R'" represents a $C_1$–$C_5$ alkyl or $C_5$–$C_6$ cycloalkyl group or the group C(O)X, where X is as defined above; and a, b and c each represent molar percentages of the polymer's structure such that in a particular polymer a has a value of 0 to 100 (preferably at least about 2), b has a value of from 0 to 100, the sum of a plus b is from about 20 to 100, and c has a value of from 0 to 80. The present amino alkoxy derivatized polymers and copolymers should contain alkoxy units pendent from amido and/or imido nitrogen in at least about 5, preferably at least about 15 weight percent of the polymer. The subject formula can further contain small amounts (up to about 10%, preferably up to about 5%) of other ethylenically polymerizable units, such as acrylonitrile, butadiene, acrylamide, acrylic acid ester of alkanols and ether alcohols, and the like.

The subject polymer described above can be formed by first providing an initial polymer by conventional free radical polymerization of maleic anhydride alone or in combination with at least one comonomer CH(R")=C(R")Z which is the precursor to the copolymer group (c) of the above formulation. For example, the initial polymer can be formed by the homopolymerization of maleic anhydride or by copolymerization of maleic anhydride and an ethylenically copolymerizable monomer selected from an alkyl vinyl ether CH(R")=C(R")OR'" where R'" represents a $C_1$–$C_5$ alkyl or a $C_5$–$C_6$ cycloalkyl group, such as methyl vinyl ether, ethyl vinyl ether, propyl vinyl ether, cyclohexyl vinyl ether, wherein methyl vinyl ether is most preferred; a vinyl aromatic compound, such as styrene, alpha-methyl styrene and their substituted (sulfonate, carboxylate or phosphonate) derivatives, such as sulfonated styrene, and the like; a vinyl $C_5$–$C_6$ cycloaliphatic or heterocyclic compound, such as vinyl cyclohexane, N-vinyl pyrrolidone, N-vinyl pyrrolidine and the like; a vinyl carboxylic acid, its alkali metal salt or amide derivative or combinations thereof. The initial polymer may be a homopolymer of maleic anhydride or may be a copolymer of maleic anhydride and at least one other group (c) which is present in a molar ratio of from 5:1 to 1:5, preferably from 1:1 to 1:4, provided there is sufficient maleic anhydride units present to be derivatized, as described below, and provide a water soluble resultant polymer.

The initial maleic anhydride polymers found useful herein are low molecular weight polymers. They should be selected so that the resultant derivatized polymer has a number average molecular weight of from about 1,000 to 100,000, preferably from about 1,500 to 50,000 most preferably 5,000 to 30,000. The maleic anhydride polymer precursor of both homopolymer and copolymer character, are formed by conventional free radical polymerization.

The derivatized maleic acid polymer is formed by reacting the maleic anhydride polymer precursor with an alkyl (preferred), cycloalkyl or aryl terminated alkoxy amine or mixtures thereof. When an alkoxy amine is used as a reactant, the imidization may be carried out neat, as the maleic anhydride polymers are normally soluble in the amines. It is preferred to commence the reaction in the presence of small amounts of water as a solvent when the polymer has low solubility in the amine reactant.

The amine reactants found useful in forming the desired derivatized maleic acid polymer can be selected from alkyl-terminated alkoxy amine (preferred) represented by the formula:

$$H_2N—(AO)_n—R''''\qquad \text{II}$$

in which AO represents a $C_2$–$C_{10}$ (preferably a $C_2$–$C_4$) oxyalkylene group, O represents an oxygen atom and A represents a $C_2$–$C_{10}$ (preferably $C_2$–$C_4$) alkylene group or mixture; and R'''' represents a $C_1$–$C_{10}$ (preferably $C_1$–$C_4$) alkyl group and n is an integer selected from 1 to 200 preferably from 1 to 70.

The precursor polymer and amine reactant form the desired derivatized maleic acid polymer by heating the reactants either in a common solvent or neat at elevated temperatures of from about 100° C. to 250° C. preferably from 170° C. to 200° C. under ambient pressure or, under a pressure lower than ambient pressure with removal of water. Further, when the reaction is carried out under ambient or substantially ambient pressure it is preferred to pass air or nitrogen gas over the liquid reaction medium or by bubbling the gas through the medium to remove water and other low molecular weight by-products from the reaction zone.

The preferred imidized derivative of maleic acid polymer (where "a" of the polymer formula is a positive integer, most preferably at least about 2) is formed by carrying out the above reaction at elevated temperatures of 170° C. to 200° C. under anhydrous conditions.

The amine reactant is normally used in from about 5 to 100 molar equivalence and preferably from 10 to 40 molar equivalence based on the maleic acid units available in the precursor polymer.

The imidization reaction can be enhanced by conducting the reaction in the presence of a basic catalyst, an acid catalyst and/or a transamidation catalyst. Such catalysts may be selected from a tertiary amine, such as dicyclohexylamine, 1,1,3,3-tetramethylguanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexyl-carbodiimide, 2,2'-bipyridyl, 2,3'-bipyridyl, 2,4'-bipyridyl or such catalyst can be selected from the group consisting of HCl, $Sb_2O_3$, Ti—$(OC_4H_9)_4$, $NaNH_2$, $SnO_2$, potassium or sodium alkoxides, manganese acetate, and the like. The catalyst can be present in amounts of from 0.1 to 5 weight percent based on the amine reactant.

The reactants are contacted with each other at the above described reaction conditions for from about 1 to 8 hours and preferably from about 1 to 2.5 hours. During the course of the reaction, water (a by-product) is removed to drive the reaction to imidization.

The derivatized maleic acid polymers, as described above, may also be formed by initially reacting maleic anhydride with the amine reactant described above to produce an amino alkoxy derivative of maleic acid. This derivatized material is then copolymerized with monomeric units capable of forming units (c) in the presence of an effective amount of a vinyl polymerization catalyst, such as a redox catalyst system or a free radical catalyst. For example, maleic anhydride can be reacted with an alkyl terminated alkoxyamine of Formula II at temperatures of from about 40° to 200° C. The higher temperature of from about 120°–200° C. is normally accompanied by removal of water. The resultant maleic acid derivative is then mixed with a second monomer such as N-vinyl pyrrolidone, in the presence of a polymerization catalyst such as free radical catalysts of azobisisobutyronitrile, dibenzoyl peroxide, lauroyl peroxide and the like or redox catalyst systems such as sodium bisulfite, ascorbic acid, hydrogen peroxide and the like. The free radical polymerization should be done using catalyst capable of causing polymerization at temperatures of from about 40° C. to 140° C.

The amino alkoxy derivative of maleic acid polymer, as defined above, is most preferably formed from a homopolymer of maleic acid or copolymers thereof having from at least about 5 to about 100 molar equivalence of —(AO)$_n$R"" units and preferably from about 10 to 40 molar equivalents based on the maleic acid units (or where Z represents a carboxylic acid or its derivatized unit, the presence of alkoxy units is based on combined maleic acid and carboxylic acid units) of the polymer and that A represents ethylene or propylene units or mixtures thereof. The most preferred comonomeric units are methyl vinyl ether, styrene, sulfonated styrene, and N-vinyl pyrrolidone.

The resultant polymer of Formula I is normally a high-boiling viscous liquid which is substantially soluble in water.

The improved cement of the present invention is composed of a substantially uniform mixture of a hydraulic cement and the derivatized maleic acid polymer of Formula I, which are both described herein above. The polymer should be present in from 0.005 to 5 (preferably from 0.03 to 1 and most preferably from 0.05 to 0.3) weight percent based on the weight of hydraulic cement. In order to aid in forming the uniform mixture, the polymer can be mixed with the cement as an aqueous solution having from about 20 to 50 weight percent of the subject polymer solids in the solution.

The polymer treated cement can be formed at any stage of the cement's formation or use. For example, the polymer can be mixed at the cement mill with clinker cement raw material during its grinding to form cement powder. It can also be applied to the cement powder during its blending with other dry materials to prepare a specific type of cement, such as blended cement, pozzolanic cement and the like.

Alternately, the improved cement can be formed in situ during the course of preparing a cement composition, such as a mortar mix (hydraulic cement, sand and water) or a concrete (hydraulic cement, sand, large aggregate, such as store, and water). The instant derivatized maleic acid polymer can be added (conventionally as an aqueous solution) as part of the water of hydration or can be added separately. In the later method of application, the water of the aqueous polymer solution should be calculated as part of the total water content of the cement composition. The water to cement ratio (w/c) should be from about 0.3 to 0.7 and preferably from about 0.35 to 0.5. The present polymer has been found capable of imparting a high degree of fluidity to an unset cement composition for sustained periods of time or, alternately, can be used to maintain the same slump as an untreated cement composition while permitting reduction in the w/c ratio to thus provide a stronger set cement composition structure or a combination of the above features.

As stated above, the derivatized maleic polymer of the improved cement (whether as a dry blend of cement and polymer or as formed in situ as part of the formation of a wet unset cement composition) should be from 0.005 to 5, preferably from 0.03 to 1 and most preferably from 0.05 to 0.3 weight percent of solid polymer based on the weight of solid hydraulic cement of the cement composition.

Cement compositions formed with the present improved cement have a significantly higher degree of flowability (higher degree of slump), than compositions formed with conventional hydraulic cement. Further, the present cement compositions are capable of retaining their high degree of slump over a sustained period of time giving the artisan an extended period to work the cement composition into its final shape. Finally, the present cement composition can achieve initial set without exhibiting excessive retardation. Thus, the use of this cement composition does not cause delay of the working time required to form a particular structure.

Conventional cement additives, such as air entrainers, water proofing agents, strength enhancers, corrosion inhibitors, antifoaming agents and curing accelerators can be used with the subject cement additive. These additives can be mixed with the cement composition prior to, along with or subsequent to the addition of the present cement additive.

The present invention is further explained by the following examples which are given for illustrative purposes only and are not meant to limit the invention, as defined by the claims, appended hereto. All parts and percentages are by weight unless otherwise stated. The term "S/S" represents solid weight of additive with respect to solid weight of cement contained in the treated composition.

EXAMPLES

Example 1

A 25% solution of 2.74 parts of a copolymer of maleic anhydride and methyl vinyl ether (50:50 mole ratio, number average molecular weight 40,000, sold under the trade name Gantrez AN 119 by ISP). To this solution was added 10 parts of a methoxy terminated polyalkoxy amine (MAOA) of number average molecular weight 2000 having an ethylene oxide:propylene oxide ratio of 32:10 (Jeffamine M-2070, Texaco). The resulting solution was heated to 180° C. under nitrogen with mechanical stirring. Water from the solvent and produced by the chemical reaction was collected, while maintaining the temperature at 180° C. for 1 hour.

The amino polyalkoxy derivative of maleic acid/methyl vinyl ether copolymer was isolated as a reddish-purple viscous liquid. ("Polymer 1").

Example 2

Using the procedure detailed in Example 1, a series of derivatized copolymers were synthesized using various mole ratios of the maleic anhydride-methyl vinyl ether copolymer to the methoxy terminated polyoxyalkylene amine having a molecular weight of 2000. The resulting products were isolated as viscous liquids ("Polymers 2A, 2B, 2C").

Example 3

Each of the polymers formed in Examples 1 and 2 above was formed into 50% aqueous solutions with deionized water. Each of these solutions was used in forming a cement composition composed of standard hydraulic portland cement and water. The polymer to cement weight ratio (solid polymer/solid cement, s/s) was 0.002 and the water to cement ratio was 0.48. A miniature slump test developed by Kantro, as described in "Cement, Concrete and Aggregates" Vol. 2, No. 2, 1980, was used to measure the slump over time for each sample. Set of the cement was measured by an automated penetrometer. The results for each of the polymers synthesized in Examples 1 and 2 are listed in Table I. Further, for comparative purposes, cement compositions were made with no polymeric admixture (blank) and with a conventional concrete superplasticizer agent, naphthalene sulfonate formaldehyde condensate ("NSFC") in dosages set forth in Table I. The results in Table I show that the present polymeric products are able to induce a high degree of flow and to sustain flow over extended periods in the cementitious compositions using low levels of polymer as compared to the blank composition or the standard superplasticizer. Further, by adjusting the dosage level one can attain these desired properties without set retardation.

using each of the three molecular weight methoxy terminated polyalkoxyamine materials at various ratios with respect to maleic anhydride. These products were used as cement fluidizers in Example 5 below.

Example 5

The reaction products of Example 4 were tested in cement compositions in the same manner as described in Example 3 above. Results of these tests are shown in Table II.

TABLE I

| Polymer | Ratio MA/MAOA | Dosage % s/s | Minislump flow (cm) 9 min. | 18 min. | 30 min. | 45 min. | 60 min. | Set time (min) |
|---|---|---|---|---|---|---|---|---|
| Example 1 | 1:0.31 | 0.2 | 22.1 | 22.4 | 22.7 | 22.7 | 20.7 | 422 |
| Example 1 | 1:0.31 | 0.07 | 17.5 | 16.5 | 15.4 | 13.3 | 11.1 | 265 |
| Example 2A | 1:0.375 | 0.2 | 21.0 | 21.5 | 21.9 | 21.1 | 19.2 | 396 |
| Example 2B | 1:0.25 | 0.2 | 22.0 | 22.3 | 22.2 | 22.3 | 21.3 | 438 |
| Example 2C | 1:0.10 | 0.2 | 18.0 | 17.5 | 16.0 | 15.0 | 14.0 | 322 |
| NSFC* | NA | 0.45 | 18.0 | 15.9 | 12.4 | 9.3 | 6.9 | 282 |
| Blank (NA) | NA | NA | 14.7 | 13.7 | 11.7 | 10.3 | 9.6 | 283 |

NA = Not Applicable
* = Comparative

TABLE II

| Polymer | MAOA Mol. Wt. | Ratio (MA/MAOA) | Dosage % S/S | Minislump flow (cm) 9 min. | 18 min. | 30 min. | 45 min. | 60 min. | Set time (min) |
|---|---|---|---|---|---|---|---|---|---|
| MA/S | 700 | 1/0.5 | 0.2 | 18.2 | 18.2 | 18.3 | 18.2 | 18.0 | 705 |
| MA/S | 700 | 1/0.75 | 0.2 | 15.7 | 14.6 | 14.5 | 14.0 | 13.3 | 357 |
| MA/S | 700 | 1/1.0 | 0.2 | 15.9 | 15.2 | 14.4 | 12.7 | 13.0 | NM |
| MA/S | 700 | 1/1.0 | 0.2 | 15.9 | 15.0 | 14.2 | 13.0 | 12.0 | NM |
| MA/S | 1000 | 1/0.5 | 0.2 | 17.2 | 16.9 | 17.0 | 16.7 | 16.2 | 571 |
| MA/S | 1000 | 1/0.75 | 0.2 | 15.8 | 14.9 | 14.5 | 14.0 | 14.0 | 314 |
| MA/S | 1000 | 1/1.0 | 0.2 | 16.1 | 15.3 | 15.0 | 14.3 | 13.6 | NM |
| MA/S | 2000 | 1/0.5 | 0.2 | 16.5 | 16.1 | 16.1 | 15.6 | 15.3 | 455 |
| MA/S | 2000 | 1/0.75 | 0.2 | 16.1 | 15.3 | 14.8 | 14.2 | 14.0 | 312 |
| MA/S | 2000 | 1/1.0 | 0.2 | 15.7 | 15.1 | 14.2 | 13.1 | 12.8 | NM |
| MA/SS | 2000 | 1/1.0 | 0.2 | 15.7 | 15.0 | 14.7 | 13.6 | 13.3 | NM |
| BLANK (NA) | NA | NA | | 14.7 | 13.7 | 11.7 | 10.3 | 9.6 | 283 |

NM = Not Measured
NA = Not Applicable
MA/S = Maleic anhydride/styrene copolymer
MA/SS = Maleic anhydride/sulfonated styrene copolymer Example 4

A series of derivatized copolymers were formed by reacting a copolymer of styrene and maleic anhydride (1:1, SMA 1000, AtoChem) with three different methoxy terminated polyalkoxyamine materials of number average molecular weights 700, 1000, and 2000 having ethylene oxide to propylene oxide ratios of 13:2, 19:3, and 32:10 respectively (Jeffamines M-715, M-1000, and M-2070, respectively, Texaco). In each instance, the mixture was stirred under nitrogen and heated to 180° C. for 1 hour with removal of water. Upon completion of the heating, homogeneous viscous liquids were formed, which were water-soluble on cooling to room temperature. Syntheses were performed Example 6

An amino alkoxy derivative of maleic acid was formed by mixing 2500 parts alkyl terminated polyalkoxyamine ($MW_n$=1000; ethyleneoxide/propyleneoxide ratio=19:3; sold under the tradename Jeffamine M-1000) with 5000 parts water to form an aqueous solution in a reaction vessel equipped with an agitator, condenser, addition funnel, $N_2$ inlet and thermometer. To the solution was added 247 parts of solid maleic anhydride and 202 parts of a 50% aqueous NaOH solution to produce a solution of the half amide-half sodium salt maleic acid reaction product.

A second solution was formed by mixing 1360 parts water with 6480 parts of a 50% aqueous NaOH solution and 3969 parts maleic anhydride. This solution was then added to the above initially formed solution.

To the solution containing a mixture of alkoxyamide derivative and sodium salt of maleic acid, was added with stirring, 5000 parts water, 130 parts sulfuric acid (96%), 770 parts hydrogen peroxide and 8.5 parts iron sulfate heptahydrate. Under an atmosphere of $N_2$ produced by a steady flow of $N_2$ gas, a solution of 10000 parts water, 4700 parts N-vinyl pyrrolidone, 136 parts 50% sodium hydroxide, 142 parts $Na_2S_2O_8$ and 89 parts ascorbic acid was added over a 0.5 hour period of time. The temperature rose to 48°-50° C. and was maintained at that temperature for one hour with stirring. The resultant solution had its pH adjusted to 7 and contained 22% solid copolymer of N-vinyl pyrrolidone/maleic acid salt/maleic acid half salt-half alkyl terminated polyalkoxyamide derivative (Solution VIA).

A series of polymer solutions were formed in the same manner as described above except that the molar ratio of N-vinylpyrrolidone (NVP), maleic acid salt (MA), and maleic acid half sodium salt-half amide adduct of Jeffamine M-1000 (MAJ) was varied as shown in Table III below:

TABLE III

| Sample | NVP | MA | MAJ |
|--------|-------|-------|-------|
| VIA | 0.497 | 0.474 | 0.029 |
| VIB | 0.50 | 0.47 | 0.03 |
| VIC | 0.50 | 0.30 | 0.20 |

Example 7

An amino alkoxy derivative of maleic acid was formed in a similar manner to that described in Example 6 above. The initial solution was formed by mixing 1840 parts water with 788 parts sulfanilic acid and then adding simultaneously 394 parts maleic anhydride and 322 parts of 50% aqueous solution of sodium hydroxide at a rate to maintain a temperature of 30°-35° C.

A second solution was formed in which 250 parts of Jeffamine M-1000 was mixed with 859 parts water to which 24.7 parts maleic anhydride and 202 parts of 50% aqueous sodium hydroxide solution were simultaneously added.

The second solution was combined with the first solution. The polymerization initiator solutions of sulfuric acid, peroxide and iron sulfate, as described in Example 6, was introduced into the solution and then a solution, as described in Example VI containing N-vinyl pyrrolidone, was added dropwise while maintaining the polymerization mixture at 50° C. and then further reacted at this temperature for one hour. The resultant solution had a polymer content of 30% and its pH was adjusted to 7 with addition of 50% sodium hydroxide solution. (Solution VIIA)

Additional solutions were formed in the same manner as above except that the molar ratio of N-vinyl pyrrolidone (NVP), maleic acid-Jeffamine M-1000 half amide reaction product (MAJ) and maleic acid-sodium salt, sulfanilic acid half amide adduct (MAS) was altered, as shown in Table IV below.

TABLE IV

| Sample | NVP | MAJ | MAS |
|--------|-------|-------|-------|
| VIIA | 0.49 | 0.029 | 0.472 |
| VIIB | 0.497 | 0.029 | 0.474 |
| VIIC | 0.51 | 0.19 | 0.30 |

Example 8

Concrete samples were made from a mix of 959 kg/m³ of fine aggregate (sand), 1,110 kg/m³ of coarse aggregate (ASTM Grade 67), 422 kg/m³ of portland cement and water in a water to cement ratio of 0.52. The concrete was mixed according to ASTM C-192 ("Making and Curing Concrete Specimens in the Laboratory"). Plastic concrete tests of slump and air were measured according to ASTM C-143 and C-138, respectively. Triplicate samples each having polymer VIA or polymer VIIA, respectively, in 0.10% solid polymer based on solid cement content were tested for plastic slump according to ASTM C-143 plastic air according to ASTM C-138, set time according to ASTM C-403 and compressive strength according to ASTM C-39. The results given in Table V below show high slump reasonable at times and good compressive strengths are attained.

TABLE V

| Additive | Dosage % S/S | Slump in | | Set Time hr:min | | Compressive Strength @ 7 days |
|----------|--------------|----------|--------|------|-------|---------|
| | | 18 min | 60 min | Init. | Final | |
| VIA | 0.10 | 8.0 | 5.5 | 4:47 | 6:43 | 5288 |
| VIIA | 0.10 | 7.8 | 3.5 | 4:43 | 6:30 | 5235 |

A concrete mix was formed in the same manner as described above except the W/C ratio was 0.51. The admixture polymers of Examples 6 and 7 were used in a dosage of 0.15% polymer based on solid cement of the concrete mix. The results (Table VI) show that very high slump is achieved along with good air and compressive strength while the set time is not excessively retarded.

TABLE VI

| Admixture | Dosage % S/S | Slump (in) | Air (%) | Set Time (hr:min) Final | Compressive Strength (%) 7 days |
|-----------|--------------|------------|---------|-------------------------|----------------------------------|
| Blank | 0.0 | 2.25 | 2.2 | 6:12 | 5353 |
| VIA | 0.15 | 6.63 | 4.1 | 9:36 | 5407 |
| VIB | 0.15 | 6.25 | 3.8 | 9:10 | 5460 |
| VIC | | | | | |
| VIIA | 0.15 | 6.68 | 4.9 | 8:20 | 5246 |
| VIIB | 0.15 | 7.13 | | 7:46 | 5085 |
| VIIC | 0.15 | 6.00 | | 7:10 | 5353 |

What is claimed:

1. An improved cement comprising a substantially uniform mixture of a hydraulic cement and from 0.005 to 5 weight percent based on the weight of said hydraulic cement of a polymer composed of units represented by the structure of:

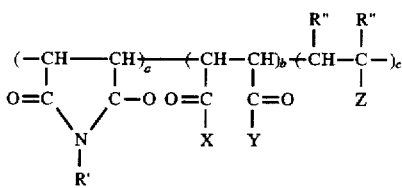

wherein R' represents an oxyalkylene or polyoxyalkylene group represented by the formula $(AO)_nR''''$ in which A is a $C_2-C_{10}$ alkylene or mixtures thereof, O is oxygen atom, n is a value of 1 to 200, and R'''' is selected from a $C_1-C_{10}$ alkyl group, $C_5-C_6$ cycloalkyl group, aryl group or mixtures thereof; X and Y each independently represent NHR', OH, $O^-M^+$ where M is an alkali metal, or ammonium cation, or X and Y together represent $-O^-M^{++}O^-$— when $M^{++}$ is an alkaline earth metal cation, R'' represents hydrogen atom or methyl group; Z represents unsubstituted or substituted aryl or $C_5-C_6$ cycloalkyl or a heterocyclic group or the group OR''', where R''' represents a $C_1-C_5$ alkyl or $C_5-C_6$ cycloalkyl group or the group C(O)X, where O and X are the same as defined above; and a, b, and c each represent molar percentages of the polymer's structure such that in a particular polymer a has a positive value up to 100, b has a value of from 0 to 100, the sum of a plus b from about 20 to 100, and c has a value of from 0 to 80; and wherein the oxyalkylene groups are present in at least about 5 weight percent of the polymer.

2. The improved cement of claim 1 wherein X represents NHR' and R' represents $(AO)_nR''''$ wherein A is a $C_2-C_4$ alkylene group or mixture thereof, R'''' is a $C_1-C_4$ alkyl group, and n is a value of 1–70.

3. The improved cement of claim 1 wherein R' represents $-(AO)_nR''''$ wherein A is a $C_2-C_4$ alkylene group or mixture thereof, R'''' is a $C_1-C_4$ alkyl group, and n is a value of 1–70.

4. The improved cement of claim 1 wherein a has a value of at least about 2.

5. The improved cement of claim 2 wherein a has a value of at least about 2.

6. The improved cement of claim 3 wherein a has a value of at least about 2.

7. The improved cement of claim 1 wherein Z represents $-OCH_3$.

8. The improved cement of claim 2 wherein Z represents $-OCH_3$.

9. The improved cement of claim 3 wherein Z represents $-OCH_3$.

10. The improved cement of claim 1 wherein Z represents an aryl group selected from phenyl or sulfonated phenyl.

11. The improved cement of claim 2 wherein Z represents an aryl group selected from phenyl or sulfonated phenyl.

12. The improved cement of claim 3 wherein Z represents an aryl group selected from phenyl or sulfonated phenyl.

13. The improved cement of claim 1 wherein Z represents a pyrrolidonyl or pyrrolidinyl group.

14. The improved cement of claim 2 wherein Z represents a pyrrolidonyl or pyrrolidinyl group.

15. The improved cement of claim 3 wherein Z represents a pyrrolidonyl or pyrrolidinyl group.

16. The improved cement of claim 1 wherein Z represents a group having the formula $-C(O)X$.

17. The improved cement of claim 2 wherein Z represents a group having the formula $-C(O)X$.

18. The improved cement of claim 3 wherein Z represents a group having the formula $-C(O)X$.

19. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 1.

20. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 2.

21. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 3.

22. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 4.

23. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 7.

24. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 10.

25. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 13.

26. In an improved composition comprising a mortar formed from a hydraulic cement, fine aggregate and water or a concrete formed from a hydraulic cement, fine aggregate, large aggregate and water, wherein the improvement comprises that said mortar or concrete is formed with the improved cement of claim 16.

27. A polymer having units represented by the formula:

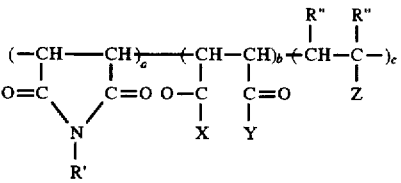

wherein R' represents an oxyalkylene or polyoxyalkylene group represented by the formula $(AO)_nR''''$ in which A is a $C_2-C_{10}$ alkylene or mixtures thereof, O is oxygen atom, n is a value of 1 to 200, and R'''' is selected from a $C_5-D_6$ alkyl group, $C_1-C_6$ cycloalkyl group, aryl group or mixtures thereof; X and Y each independently represent NHR', OH, $O^-M^+$ where M is an alkali metal, or ammonium cation, or X and Y together represent —O⁻M⁺⁺ when M⁺⁺ is an alkaline earth metal cation; R" represents hydrogen atom or methyl group; Z represents unsubstituted or substituted aryl or C₅–C₆ cycloalkyl or a heterocyclic group or the group OR'", where R'" represents a C₁–C₅ alkyl or C₅–C₆ cycloalkyl group or the group C(O)X, where O and X are the same as defined above; and a, b, and C each represent molar percentages of the polymer's structure such that in a particular polymer a has a positive value up to 100, b has a value of from 0 to 100, the sum of a plus b is from about 20 to 100, and c has a value of from 0 to 80; and wherein the oxyalkylene groups are present in at least about 5 weight percent of the polymer.

28. The polymer of claim 27 wherein X represents NHR' and R' represents (AO)ₙR"" wherein A is a C₂–C₄ alkylene group or mixture thereof, R"" is a C₁–C₃ alkyl group and n is a value of 1–70, and a represents a value of at least about 2.

29. The polymer of claim 27 wherein R' represents —(AO)ₙR"" wherein A is a C₂–C₄ alkylene group or mixture thereof, R"" is a C₁–C₄ alkyl group, and n is a value of 1–70.

30. An improved cement composition according to claim 1 wherein the polymer consists essentially of the polymer structure

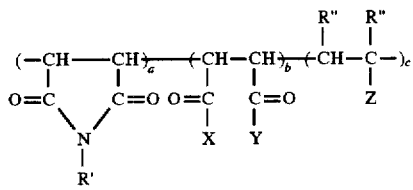

wherein R', X, Y, Z, R", a, b, and c are as defined in claim 1.

31. A polymer according to claim 27 wherein the polymer consists essentially of the structure

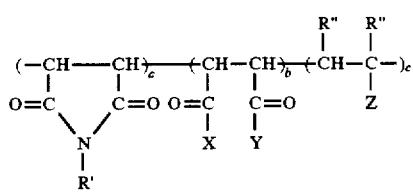

wherein R', X, Y, Z, R", a, b, and c are as defined in claim 27.

* * * * *